United States Patent
Nanivadekar et al.

(10) Patent No.: US 12,254,091 B2
(45) Date of Patent: Mar. 18, 2025

(54) ENDPOINT INCIDENT RESPONSE FROM A SECURE ENCLAVE THROUGH DYNAMIC INSERTION OF AN INTERRUPT

(71) Applicant: VMware, Inc., Palo Alto, CA (US)

(72) Inventors: Mandar Nanivadekar, Pune (IN); Sachin Shinde, Pune (IN); Bharath Kumar Chandrasekhar, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 247 days.

(21) Appl. No.: 17/979,482

(22) Filed: Nov. 2, 2022

(65) Prior Publication Data
US 2024/0143763 A1 May 2, 2024

(51) Int. Cl.
*G06F 21/56* (2013.01)
*G06F 21/53* (2013.01)
*G06F 21/54* (2013.01)

(52) U.S. Cl.
CPC ............ *G06F 21/568* (2013.01); *G06F 21/53* (2013.01); *G06F 21/54* (2013.01); *G06F 2221/033* (2013.01)

(58) Field of Classification Search
CPC .......... G06F 21/50; G06F 21/52; G06F 21/53; G06F 21/54; G06F 21/56; G06F 21/568; G06F 2221/033
See application file for complete search history.

(56) References Cited

U.S. PATENT DOCUMENTS

| | | | | |
|---|---|---|---|---|
| 8,793,803 B2* | 7/2014 | Henry | ..................... | G06F 21/12 726/26 |
| 9,201,612 B1* | 12/2015 | Vincent | ................. | G06F 9/4856 |
| 11,113,094 B1* | 9/2021 | Koryakin | .............. | G06F 9/4843 |
| 11,237,860 B2* | 2/2022 | Das | ......................... | G06F 9/5027 |
| 2008/0082881 A1* | 4/2008 | Szydlowski | ............ | G06F 11/24 714/E11.154 |
| 2012/0246723 A1* | 9/2012 | Lee | ........................... | G06F 8/65 726/22 |
| 2012/0331467 A1* | 12/2012 | Neiger | .................... | G06F 13/24 718/1 |
| 2018/0060103 A1* | 3/2018 | Tsirkin | ................ | G06F 9/45545 |
| 2019/0095616 A1* | 3/2019 | Drapeau | ................ | G06F 21/566 |

* cited by examiner

*Primary Examiner* — Boris D Grijalva Lobos
(74) *Attorney, Agent, or Firm* — Kim & Stewart LLP (57) ABSTRACT

A method of protecting an endpoint against a security threat detected at the endpoint, wherein the endpoint includes, in memory pages of the endpoint, an operating system (OS), a separate software entity, and remediation code, includes the steps of: transferring control of virtual CPUs (vCPUs) of the endpoint from the OS to the separate software entity; and while the separate software entity controls the vCPUs, storing, in an interrupt dispatch table, an instruction address corresponding to an interrupt, wherein the remediation code is stored at the instruction address, and replacing a next instruction to be executed by the OS, with an interrupt instruction, wherein the interrupt is raised when the OS executes the interrupt instruction, and the remediation code is executed as a result of handling of the interrupt that is raised.

20 Claims, 7 Drawing Sheets

ENDPOINT INCIDENT RESPONSE FROM A SECURE ENCLAVE THROUGH DYNAMIC INSERTION OF AN INTERRUPT

BACKGROUND

There exists a wide array of solutions for responding to malware attacks, such attacks involving unauthorized actions being performed on a victim's computer system. Some incident-response (IR) solutions offer cloud-based response capabilities in which administrators remotely communicate with agents that are running in the computer system. Using a simulated shell environment with a command-line interface (CLI), administrators isolate infected computers by stopping their network activity except for that between the agents and the administrators. Additionally, through the CLI, administrators remediate threats by terminating malicious processes.

However, responding to such incidents remotely may not provide protection in certain cases. First, sophisticated malware has been developed that hijacks the agents' activities including the networking activities thereof, which prevents the administrators from transmitting a response to the agents altogether. Second, even if the administrators are able to transmit a response, some malware tracks commands that the agents execute. By tracking these commands, such malware learns the remediation behavior to make future attacks more difficult to neutralize. Third, establishing a network connection between agents and the cloud in order to transmit the response may take a long time. During that time, the malware may be able to complete its unauthorized activities and destroy any evidence. A solution that can be used for isolating a computer system and responding to incidents and that is impervious to the above-mentioned behaviors of sophisticated malware is needed.

SUMMARY

Accordingly, one or more embodiments provide a method of protecting an endpoint against a security threat detected at the endpoint, wherein the endpoint includes, in memory pages of the endpoint, an operating system (OS), a separate software entity, and remediation code. The method includes the steps of: transferring control of virtual CPUs (vCPUs) of the endpoint from the OS to the separate software entity; and while the separate software entity controls the vCPUs, storing, in an interrupt dispatch table, an instruction address corresponding to an interrupt, wherein the remediation code is stored at the instruction address, and replacing a next instruction to be executed by the OS, with an interrupt instruction, wherein the interrupt is raised when the OS executes the interrupt instruction, and the remediation code is executed as a result of handling of the interrupt that is raised.

Further embodiments include a non-transitory computer-readable storage medium comprising instructions that cause a computer system to carry out the above method, as well as a computer system configured to carry out the above method.

DETAILED DESCRIPTION

Techniques for protecting an endpoint, e.g., a VM, in response to a security attack are described. The techniques involve utilizing a "guest monitor," which is a software entity of the VM that can access memory pages allocated to the VM. Like an agent running inside the VM, the guest monitor may be utilized to provide cloud-based IR. However, unlike the agent, when the VM is launched, the guest monitor is loaded into a portion of VM memory that is inaccessible to an OS of the VM. As such, the guest monitor can execute remediation-related commands from a secure enclave of the VM that is inaccessible to malware executing inside the VM. Such malware thus cannot prevent a cloud-based server from transmitting a response to the guest monitor and cannot observe the guest monitor's behavior. Furthermore, for even faster IR, a local security appliance instead of the cloud-based server may transmit a response to the guest monitor.

Whenever the guest monitor is "awakened," control over vCPUs of the VM are transferred from the OS to the guest monitor, which effectively "freezes" the OS and any malware executing in the VM. The VM is thus isolated whenever its guest monitor is awakened. While the VM is isolated, the guest monitor creates an interrupt service routine, the handling of which involves executing remediation code. Furthermore, the guest monitor causes the OS to raise an interrupt corresponding to the new interrupt service routine as the next instruction for the OS to execute when control of the vCPUs is returned to the OS. Accordingly, the OS has no opportunity to run any malicious code before raising and handling the interrupt to neutralize the security threat. These and further aspects of the invention are discussed below with respect to the drawings.

Figure 1:
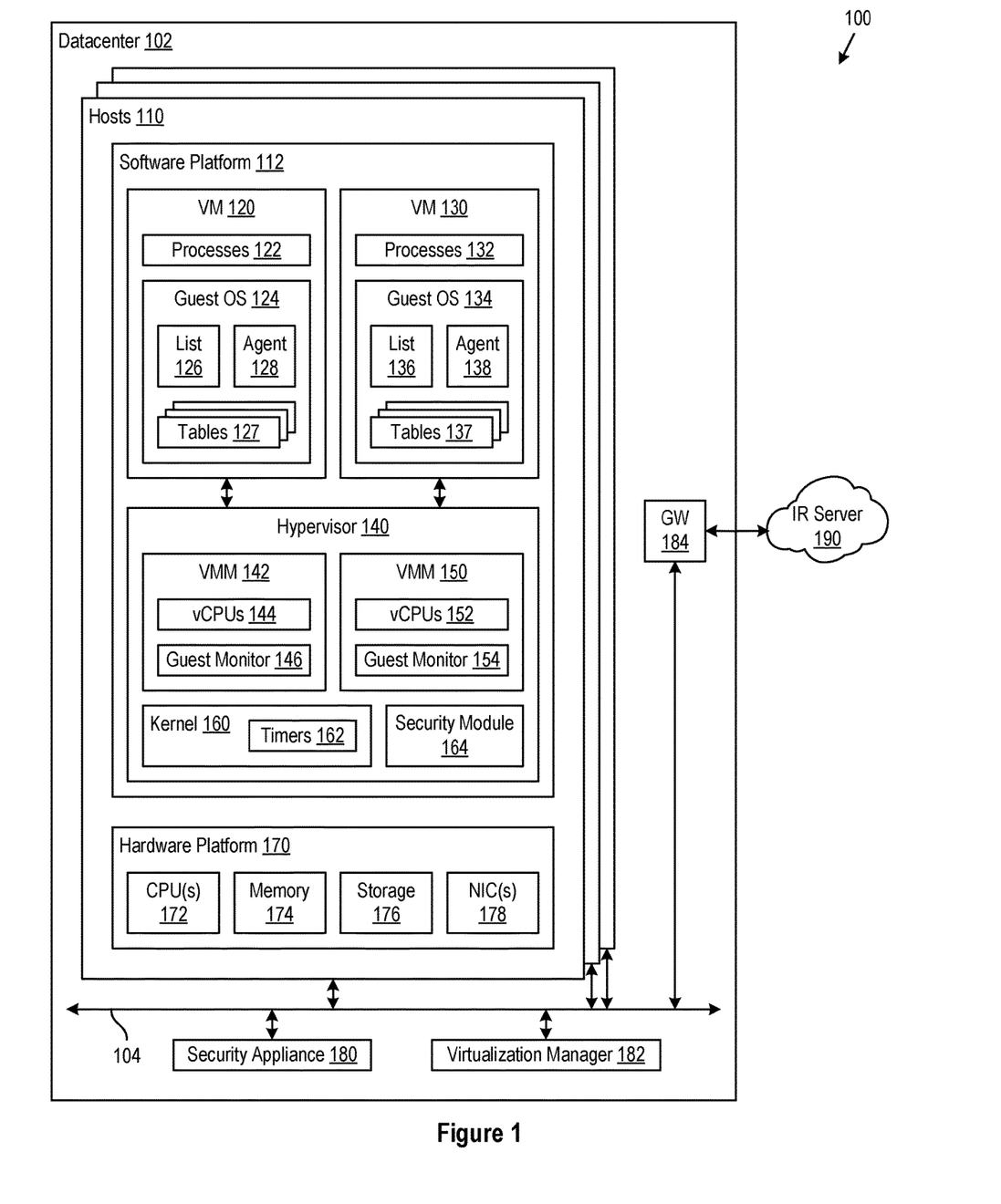
FIG. 1 is a block diagram of a virtualized computer system in which embodiments may be implemented.

FIG. 1 is a block diagram of a virtualized computer system 100 in which embodiments may be implemented. Virtualized computer system 100 includes a cluster of hosts 110, a security appliance 180, and a virtualization manager 182 executing in a data center 102, and an IR server 190 executing remotely. Data center 102 may be an on-premise data center that is controlled and administrated by a particular enterprise or business organization. Data center 102 may also be a cloud data center that is operated by a cloud computing service provider. IR server 190 is administrated from outside data center 102 to remotely respond to incidents (e.g., security threats) in hosts 110. Although FIG. 1 depicts a single datacenter with hosts executing therein, other embodiments utilize a hybrid model including both an on-premise datacenter and a cloud datacenter. In such a hybrid model, the on-premise datacenter includes hosts executing therein, and the cloud datacenter includes a cloud management platform that controls software executing on the hosts of the on-premise data center.

Each of hosts 110 is a server constructed on a server grade hardware platform 170 such as an x86 architecture platform. Hardware platform 170 includes conventional components of a computing device, such as one or more central processing units (CPUs) 172, system memory 174 such as random-access memory (RAM), local storage 176 such as one or more magnetic drives or solid-state drives (SSDs), and one or more network interface cards (NICs) 178. CPU(s) 172 are configured to execute instructions such as executable instructions that perform one or more operations described herein, such executable instructions being stored in system memory 174. Local storage 176 of hosts 110 may optionally be aggregated and provisioned as a virtual storage area network (vSAN). NIC(s) 178 enable hosts 110 to communicate with each other and with other devices over a physical network 104.

Each hardware platform 170 supports a software platform 112. Software platform 112 includes a hypervisor 140, which is a virtualization software layer that abstracts hardware resources of hardware platform 170 for concurrently running VMs such as VMs 120 and 130. One example of a hypervisor 140 that may be used is a VMware ESX® hypervisor, available from VMware, Inc. Although the disclosure is described with reference to VMs, the teachings herein also apply to other types of virtual computing instances such as containers, Docker® containers, data compute nodes, isolated user space instances, and the like that may be attacked by malware and that may be remediated according to embodiments.

VMs 120 and 130 execute processes 122 and 132, which are respectively supported by guest OSs 124 and 134. Each guest OS includes a process list 126 or 136, which is a data structure such as a linked list capturing information about processes running in the respective VMs. For example, process lists 126 and 136 may include the names and memory usage of running processes along with those of any threads executing therein. Each guest OS further includes interrupt dispatch tables 127 or 137. Interrupt dispatch tables 127 and 137 are data structures that are used to determine how to handle interrupts raised by VMs 120 and 130, respectively.

Each guest OS further includes a guest agent 128 or 138 for collecting information about the respective guest OSs such as memory offsets of respective process lists. Guest agents 128 and 138 are configured to directly communicate with IR server 190 to allow for remote monitoring, isolation, and remediation of VMs 120 and 130. On the other hand, according to embodiments, to thwart sophisticated malware, guest agents 128 and 138 are also configured to share information with guest monitors 146 and 154, respectively, including the memory offsets of the respective process lists. Specifically, each guest agent shares the information with a hypervisor kernel 160, which forwards the information to the respective guest monitors. Guest monitors 146 and 154 and hypervisor kernel 160 are discussed further below.

Hypervisor 140 includes virtual machine monitors (VMMs) 142 and 150, hypervisor kernel 160, and a security module 164. VMMs 142 and 150 implement the virtual system support needed to coordinate operations between hypervisor 140 and VMs 120 and 130, respectively. Each VMM manages a virtual hardware platform for a corresponding VM. Such a virtual hardware platform includes emulated hardware such as vCPUs 144 or 152 and guest physical memory. Each VMM further includes nested page tables (not shown) for translating virtual addresses of a corresponding VM to physical addresses of system memory 174.

Each of interrupt dispatch tables 127 corresponds to one of vCPUs 144, and each of interrupt dispatch tables 137 corresponds to one of vCPUs 152. Whenever an interrupt is raised on one of vCPUs 144, the corresponding one of interrupt dispatch tables 127 is used to determine how to handle the interrupt on the vCPU. Similarly, whenever an interrupt is raised on one of vCPUs 152, the corresponding one of interrupt dispatch tables 137 is used to determine how to handle the interrupt on the vCPU. Each VMM further includes guest monitor 146 or 154 for its respective VM.

Guest monitors 146 and 154 are software entities that reside in the memory spaces of VMs 120 and 130, respectively. However, guest monitors 146 and 154 specifically reside in memory pages that are made inaccessible to guest OSs 124 and 134, i.e., in secure enclaves of VMs 120 and 130. Resultingly, guest monitors 146 and 154 can access all the memory pages allocated to VMs 120 and 130, respectively. However, all other processes of VMs 120 and 130 can only access a subset of such pages, i.e., the pages that are allocated to VMs 120 and 130 minus the pages in which guest monitors 146 and 154 reside. Although embodiments are described with respect to guest monitors 146 and 154, in other embodiments, other components including hypervisor kernel 160 may instead be used to monitor VMs 120 and 130 and provide IR to threats therein.

Hypervisor kernel 160 provides OS functionalities such as file system, process creation and control, and process threads. Hypervisor kernel 160 also provides scheduling of CPU(s) 172 and system memory 174 across VMs 120 and 130, VMMs 142 and 150, and security module 164. Hypervisor kernel 160 includes timers 162, one for guest OS 124 and guest monitor 146 and another for guest OS 134 and guest monitor 154. When one of timers 162 expires, hypervisor kernel 160 "freezes" the corresponding guest OS by saving a state of the guest OS from registers of the corresponding VM's vCPUs and transferring control of the vCPUs to the corresponding guest monitor. The guest monitor can then execute commands (if any have been provided to the guest monitor). After the guest monitor executes its commands (if any), hypervisor kernel 160 repopulates the registers of the VM's vCPUs with their saved state, transfers control of the vCPUs back to the guest OS, and restarts timer 162.

It should be noted that hypervisor kernel 160 also transfers control of the vCPUs in other situations. For example, hypervisor 140 may install "write traces" on various memory pages allocated to VMs 120 and 130, specifically in locations that guest OSs 124 and 134 are not expected to write to. The installation of write tracing is further described in U.S. patent application Ser. No. 17/002,233, filed Aug. 25, 2020, the entire contents of which are incorporated herein by reference. When one of guest OSs 124 and 134 writes to a traced location, hypervisor 140 is notified, which is referred to as a "trace fire." Alternative to write tracing, VMMs 142 and 150 may set "read-only" flags in respective nested page tables to track the locations that guest OSs 124 and 134 are not expected to write to. When one of guest OSs 124 and 134 attempts to write to a read-only page, a fault is triggered, and a fault handler notifies hypervisor 140 of the attempted write. In response to a trace fire or to such a fault, hypervisor kernel 160 saves the state of the responsible guest OS from registers of the associated VM's vCPUs and transfers control of the vCPUs to the respective guest monitor.

It should be noted that because guest OSs 124 and 134 are unaware of the presence of guest monitors 146 and 154, hypervisor kernel 160 only briefly takes control of vCPUs away from a guest OS. For example, the total time during which hypervisor kernel 160 takes control away from the guest OS may be approximately equal to the amount of time it takes for the corresponding guest monitor to transmit a packet to security appliance 180 plus the amount of time it takes for security appliance 180 to transmit a packet back to the guest monitor. As such, vCPUs 144 and 152 always appear to be "alive" from the perspective of guest OSs 124 and 134 despite brief intervals of apparent vCPU inactivity. When control is transferred from a guest monitor back to a guest OS, the vCPUs appear to the guest OS to be functioning normally such that it is unnecessary for the guest OS to execute any recovery mechanisms.

Security module 164 connects to guest monitors 146 and 154 and to security appliance 180. Security module 164 thus acts as a bridge between guest monitor 146 and security appliance 180 and between guest monitor 154 and security appliance 180. Security appliance 180 may be a computer program that resides and executes in a central server of data center 102 or a VM executing in one of hosts 110. For local IR, VMs of hosts 110 can be remediated directly from security appliance 180. Otherwise, security appliance 180 further connects to IR server 190, thus acting as a bridge between security module 164 of each of hosts 110 and IR server 190. IR server 190 is a cloud-controlled server through which an administrator monitors and remediates VMs of hosts 110 from outside data center 102.

Virtualization manager 182 communicates with hosts 110 via a management network (not shown) provisioned from network 104 to perform administrative tasks such as managing hosts 110, provisioning and managing VMs 120 and 130, migrating VMs from one of hosts 110 to another, and load balancing between hosts 110. Virtualization manager 182 may be a computer program that resides and executes in a central server of data center 102 or a VM executing in one of hosts 110. One example of virtualization manager 182 is VMware vCenter Server,® available from VMware, Inc.

Gateway 184 provides VMs 120 and 130, security appliance 180, and other devices in data center 102 with connectivity to an external network, e.g., the Internet. Communication between devices in data center 102 and IR server 190 are thus facilitated by gateway 184. Gateway 184 manages public internet protocol (IP) addresses for VMs 120 and 130 and security appliance 180 and routes traffic incoming to and outgoing from data center 102. Gateway 184 may also provide networking services such as firewalls, network address translation (NAT), dynamic host configuration protocol (DHCP), load balancing, and virtual private network (VPN) connectivity over the external network. Gateway 184 may be a computer program that resides and executes in a central server of data center 102 or a VM executing in one of hosts 110.

Figure 2A:
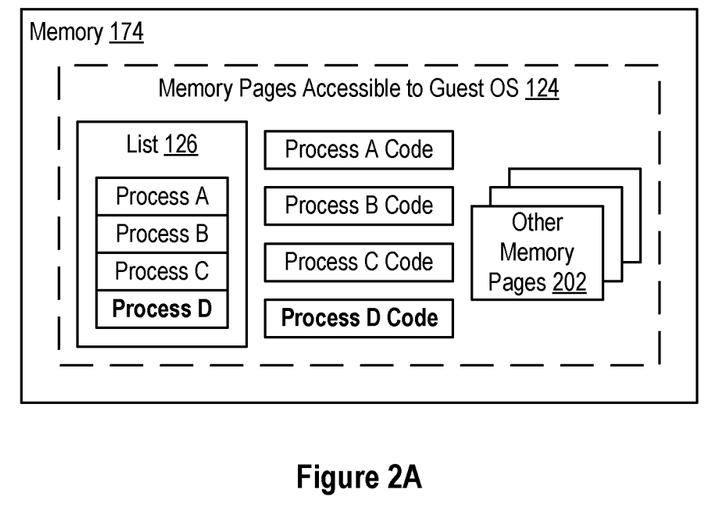
FIG. 2A is a system diagram illustrating an example of memory pages accessible to a guest OS of a virtual machine (VM) after a security threat is detected at the VM.

FIG. 2A is a system diagram illustrating an example of memory pages accessible to guest OS 124 of VM 120 after a security threat is detected at VM 120. In the example of FIG. 2A, guest OS 124 is supporting four processes A, B, C, and D, process D being malicious. As such, system memory 174 includes the code of each process, and process list 126 lists each of the processes. The memory space of VM 120 further includes any other memory pages 202 that are accessible to guest OS 124, which may include memory traces in locations that guest OS 124 is not expected to write to and which may be set as read-only.

Figure 2B:
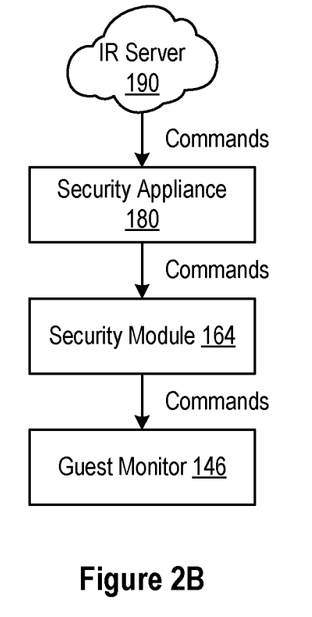
FIG. 2B is a system diagram illustrating an example of remotely transmitting commands to a guest monitor of the VM to neutralize the detected security threat.

FIG. 2B is a system diagram illustrating an example of remotely transmitting commands to guest monitor 146 to neutralize the security threat detected at VM 120. First, IR server 190 transmits the commands to security appliance 180. Such transmission may be executed by the administrator of IR server 190, or such transmission may be executed automatically by IR server 190 in response to the security threat. Next, security appliance 180 forwards the commands to security module 164 in hypervisor 140. Finally, security module 164 forwards the commands to guest monitor 146 to be executed the next time control of vCPUs 144 is transferred from guest OS 124 to guest monitor 146. The commands executed by guest monitor 146 include storing remediation code in memory pages accessible to guest OS 124 and causing guest OS 124 to raise an interrupt and execute the remediation code to terminate the malicious process and neutralize the security threat. It should be noted that for faster IR response, commands may be provided directly from security appliance 180 without IR server 190.

Figure 2C:
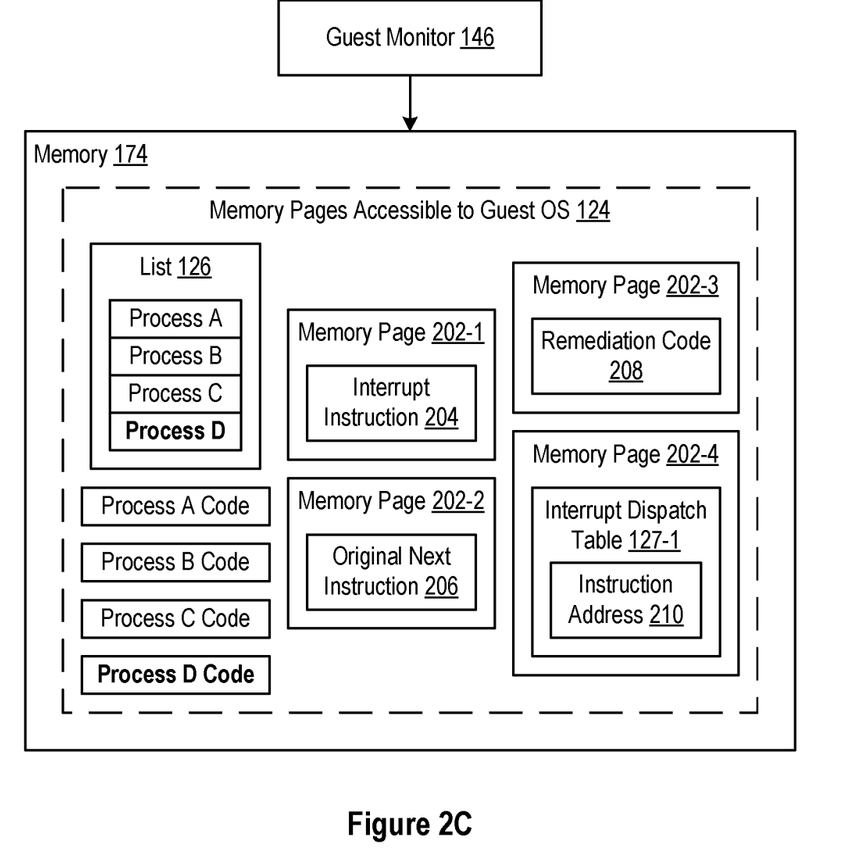
FIG. 2C is a system diagram illustrating an example of storing an interrupt instruction, remediation code, and an instruction address in the memory pages accessible to the guest OS to cause the guest OS to raise an interrupt and remediate the VM.

FIG. 2C is a system diagram illustrating an example of storing an interrupt instruction 204, remediation code 208, and an instruction address 210 in memory pages 202 accessible to guest OS 124 to cause guest OS 124 to raise an interrupt and remediate VM 120. As illustrated, guest monitor 146 stores interrupt instruction 204 in a memory page 202-1, which when executed by guest OS 124, causes guest OS 124 to raise the interrupt. Specifically, guest monitor 146 stores interrupt instruction 204 to further cause guest OS 124 to execute interrupt instruction 204 immediately upon control of vCPUs 144 being transferred from guest monitor 146 to guest OS 124. Guest OS 124 will execute interrupt instruction 204 as its next instruction instead of an original next instruction 206 in a memory page 202-2. Original next instruction 206 is the next instruction guest OS 124 was going to execute before guest OS 124 was frozen.

Guest monitor 146 also stores remediation code 208 in a memory page 202-3, which when executed by guest OS 124, remediates VM 120, e.g., by deleting the code of malicious process D. Guest monitor 146 also stores instruction address 210 in an interrupt dispatch table 127-1, which corresponds to one of vCPUs 144 and is stored in a memory page 202-4. Instruction address 210 is an address of remediation code 208 and is thus used by guest OS 124 to locate remediation code 208 to handle the interrupt.

Figure 3A:
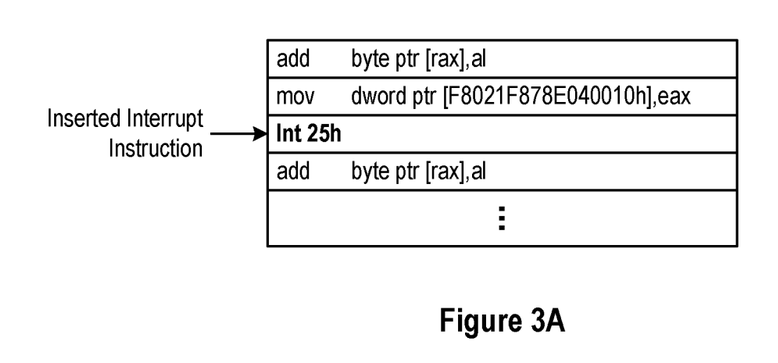
FIG. 3A is a block diagram illustrating instructions executable by the guest OS including the interrupt instruction for raising the interrupt.

FIG. 3A is a block diagram illustrating instructions executable by guest OS 124 including interrupt instruction 204. Interrupt instruction 204, which is illustrated as "Int 25h," includes an index "25h" (25 hexadecimal). 25h is an index of interrupt dispatch table 127-1. When guest OS 124 executes interrupt instruction 204, guest OS 124 raises an interrupt and handles the interrupt based on instructions stored in interrupt dispatch table 127-1 at index 25h. Furthermore, it should be noted that interrupt instruction 204 has been stored in memory as the next instruction for guest OS 124 to execute. Accordingly, guest OS 124 has already executed the instruction "mov dword ptr [F8021F878E040010h],eax," and when guest OS 124 next has control of vCPUS 144, guest OS 124 will immediately execute "Int 25h."

Figure 3B:
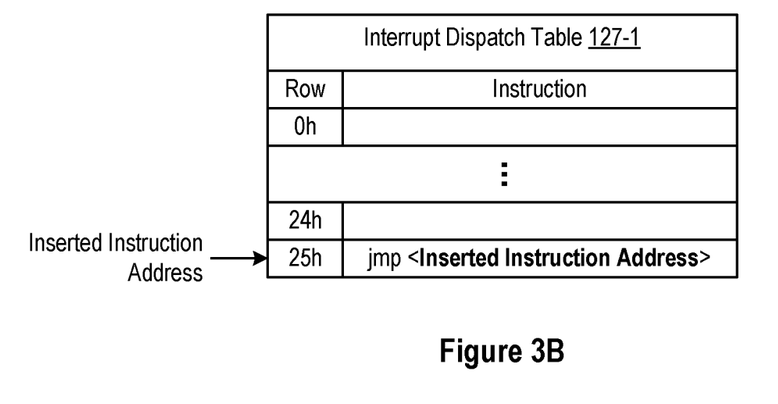
FIG. 3B is a block diagram illustrating an interrupt dispatch table used by embodiments including the instruction address at which the remediation code is stored.

FIG. 3B is a block diagram illustrating interrupt dispatch table 127-1. In the example of FIG. 3B, interrupt dispatch table 127-1 includes entries at rows 0h to 25h, i.e., indexes 0h to 25h. Furthermore, at row 25h, guest monitor 146 has inserted a "jmp" instruction and instruction address 210. If guest OS 124 executes interrupt instruction 204, which specifies index (row) 25h, guest OS 124 executes the "jmp" instruction inserted at row 25h and then executes remediation code 208, which is stored at instruction address 210.

Figure 3C:
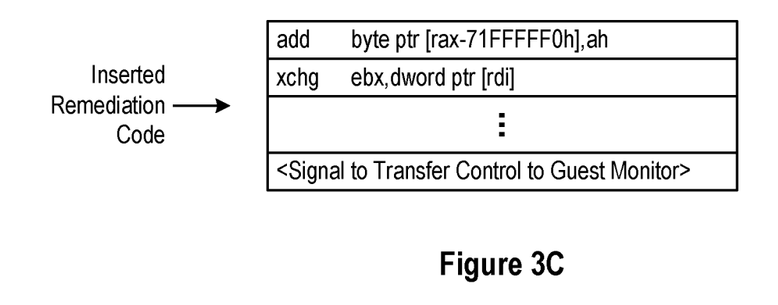
FIG. 3C is a block diagram illustrating the remediation code for handling the interrupt.
Figure 7:
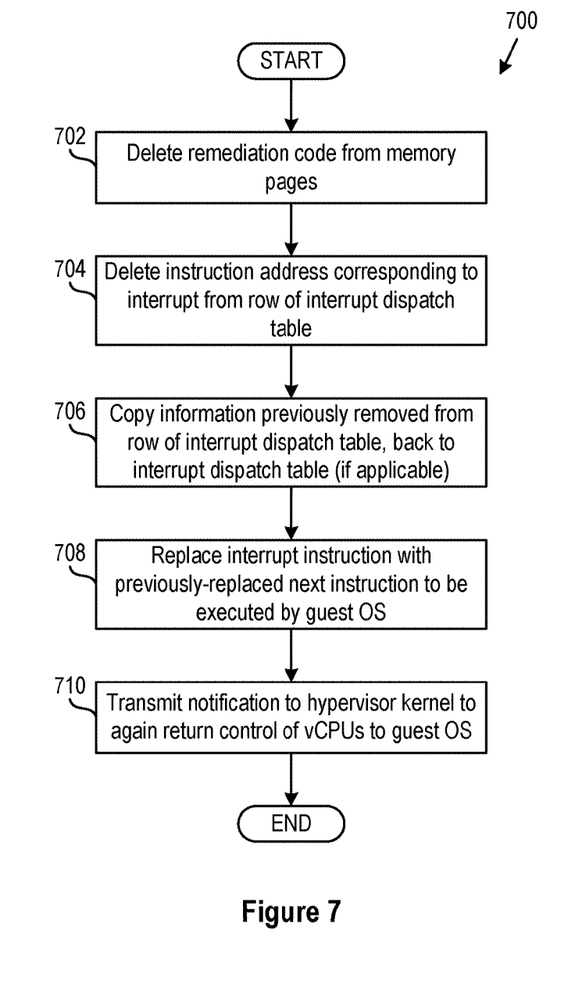
FIG. 7 is a flow diagram of steps carried out by the guest monitor to clean up the memory pages accessible to the guest OS after the guest OS executes the remediation code, according to an embodiment.

FIG. 3C is a block diagram illustrating remediation code 208 for handling the interrupt. Remediation code 208 includes instructions such as "add" and "xchg" instructions for neutralizing the detected security threat, e.g., by deleting malicious code. Additionally, as a last instruction for guest OS 124 to execute, remediation code 208 includes signaling to hypervisor kernel 160 to again transfer control of vCPUs 124 to guest monitor 146. Control is transferred to guest monitor 146 at the end of remediation so that guest monitor 146 can perform various cleanup tasks, as discussed further below in conjunction with 7.

Figure 4:
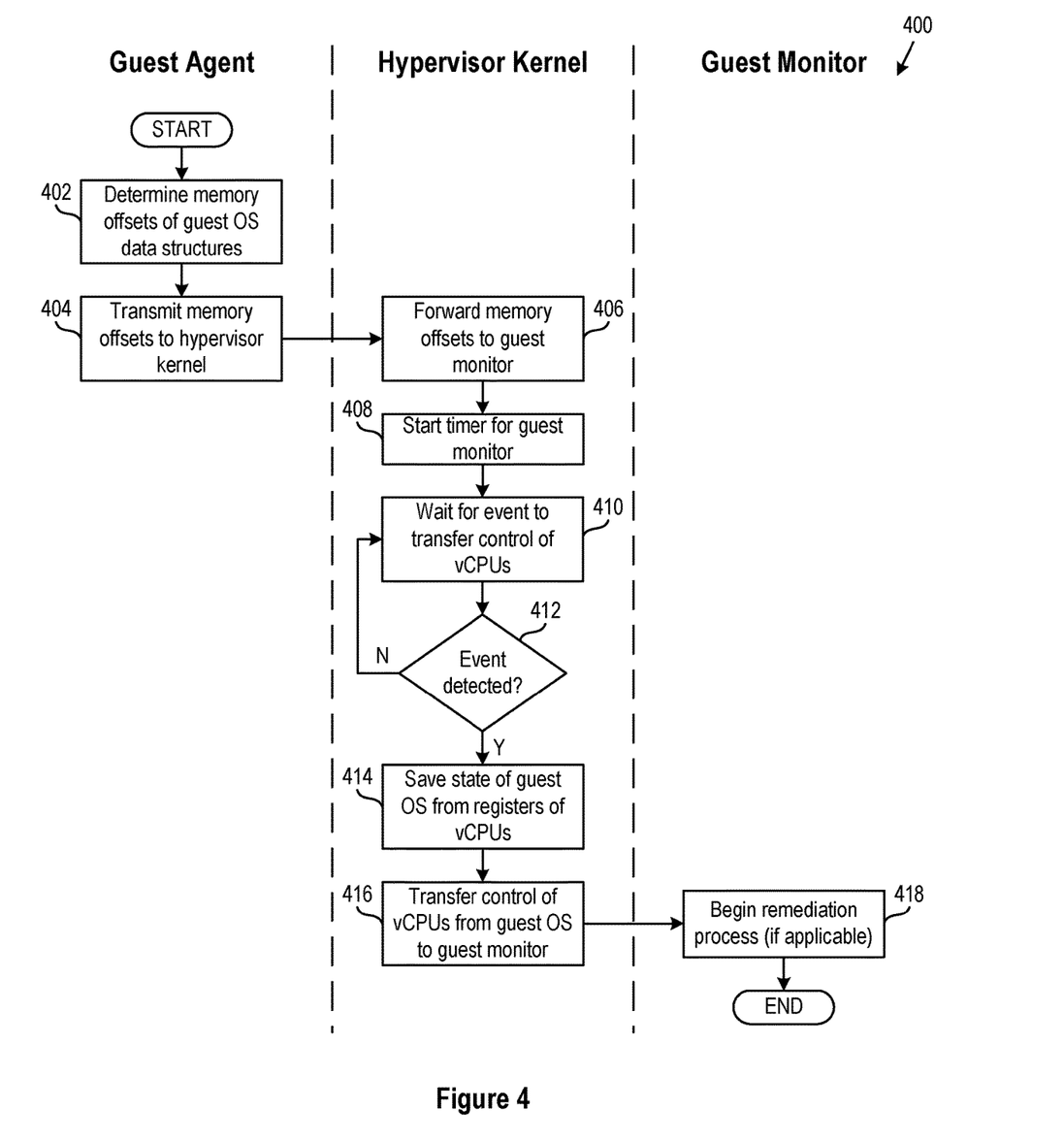
FIG. 4 is a flow diagram of steps carried out by a guest agent, hypervisor kernel, and guest monitor to initialize the guest monitor to wait for an event to begin a remediation process, according to an embodiment.

FIG. 4 is a flow diagram of steps of a method 400 carried out by guest agent 128, hypervisor kernel 160, and guest monitor 146 to initialize guest monitor 146 to wait for an event to begin a remediation process, according to an embodiment. At step 402, VM 120 begins booting, and as VM 120 boots, guest agent 128 determines the memory offsets of memory pages at which guest OS 124 data structures such as process list 126 and interrupt dispatch tables 127 are stored. At step 404, guest agent 128 transmits the memory offsets to hypervisor kernel 160.

At step 406, hypervisor kernel 160 detects the memory offsets and forwards the offsets to guest monitor 146. Guest monitor 146 later uses the offsets, e.g., to scan process list 126 to analyze the state of VM 120 after a security attack and provide information to IR server 190. IR server 190 uses such information to determine how to respond and transmits commands to guest monitor 146, as discussed above in conjunction with FIG. 2B. Guest monitor 146 also later uses such offsets to locate and update interrupt dispatch tables 127, according to embodiments.

At step 408, hypervisor kernel 160 starts timer 162 corresponding to VM 120 to expire after a specified time interval elapses. The time interval can be predetermined such that it is the same each time hypervisor kernel 160 starts timer 162. The time interval can also be determined at run time. For example, hypervisor kernel 160 may initially start timer 162 to expire after one second. Later, a security threat may be detected that requires remediation. After the security threat is remediated and any malicious process(es) are terminated, hypervisor kernel 160 may reduce the time interval, e.g., to two hundred fifty milliseconds.

At step 410, hypervisor kernel 160 waits for an event that triggers transferring control of vCPUs 144 from guest OS 124 to guest monitor 146. As discussed earlier, hypervisor kernel 160 may transfer control in response to timer 162 elapsing, a trace fire, or a fault. At step 412, if such an event has not yet been detected, method 400 returns to step 410, and hypervisor kernel 160 continues to wait for an event. Otherwise, if such an event has been detected, method 400 moves to step 414, and hypervisor kernel 160 begins the process of freezing guest OS 124. At step 414, hypervisor kernel 160 saves the state of guest OS 124 from registers of vCPUs 144, to system memory 174. At step 416, hypervisor kernel 160 transfers control of vCPUs 144 from guest OS 124 to guest monitor 146, thus preventing guest OS 124 from scheduling any tasks on vCPUs 144. After step 416, guest OS 124 is frozen. By extension, any malware executing in VM 120 is similarly frozen, and guest OS 124 cannot schedule any tasks originating from such malware.

At step 418, if commands have been provided to guest monitor 146 to begin a remediation process, guest monitor 146 begins the remediation process, as discussed further below in conjunction with FIG. 5. After step 418, method 400 ends. It should be noted that if no such commands have been provided to guest monitor 146, guest monitor 146 signals to hypervisor kernel 160 to transfer control of vCPUs 144 back to guest OS 124. Hypervisor kernel 160 then restores the state of guest OS 124 to vCPUs 144, returns control of vCPUs 144 to guest OS 124, and waits again for an event to transfer control of vCPUs 144 to guest monitor 146.

Figure 5:
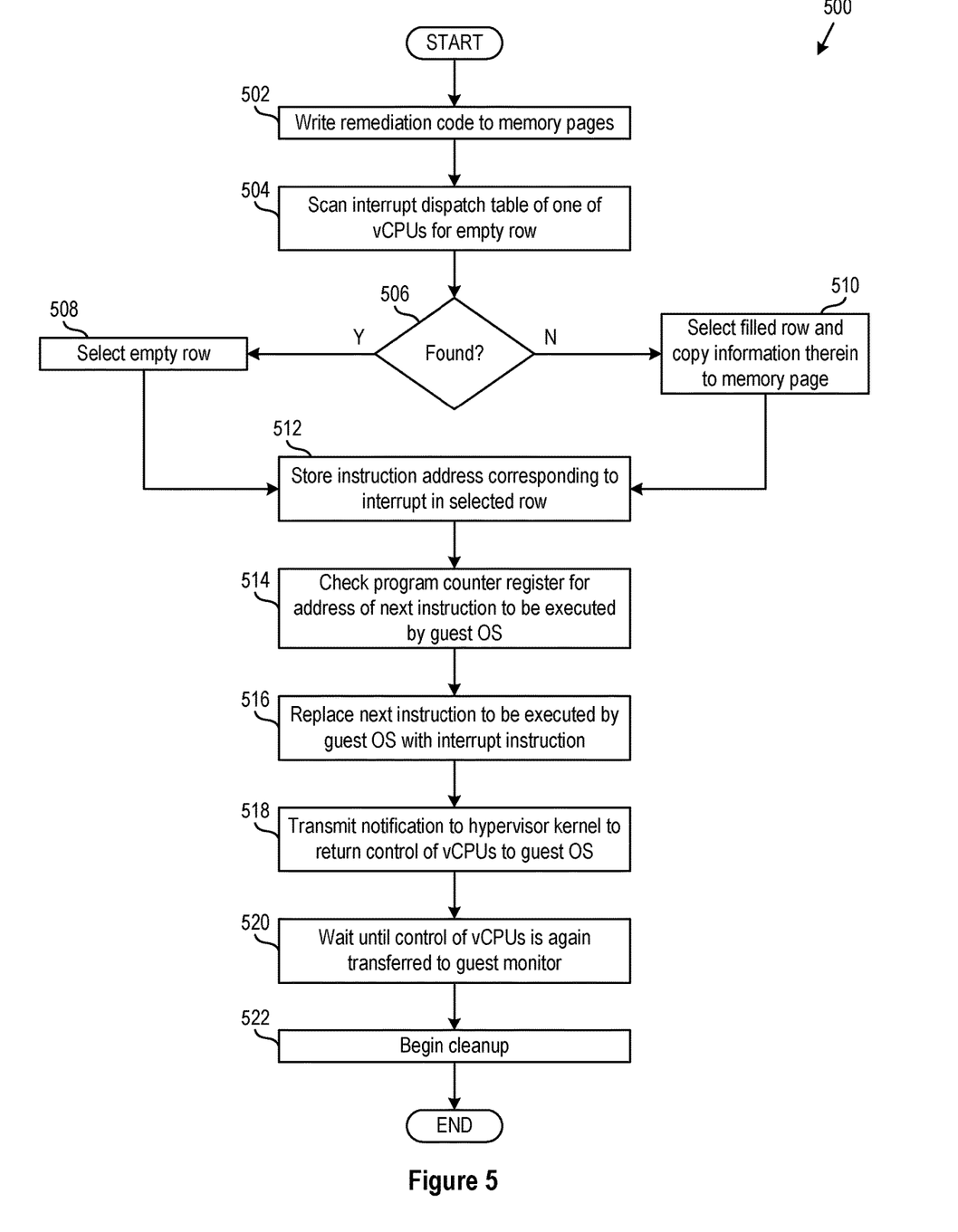
FIG. 5 is a flow diagram of steps carried out by the guest monitor to cause the guest OS to raise an interrupt and handle the interrupt by executing remediation code, according to an embodiment.

FIG. 5 is a flow diagram of steps of a method 500 carried out by guest monitor 146 to cause guest OS 124 to raise an interrupt and handle the interrupt by executing remediation code, according to an embodiment. Method 500 is carried out upon guest monitor 146 freezing guest OS 124 and beginning a remediation process, as described above in conjunction with FIG. 4. At step 502, guest monitor 146 writes remediation code to memory pages accessible to guest OS 124. Specifically, guest monitor 146 writes remediation code received from IR server 190 or directly from security appliance 180.

At step 504, guest monitor 146 scans one of interrupt dispatch tables 127 for an empty row, i.e., a row that does not currently store instructions for handling any interrupts. At step 506, if guest monitor 146 found an empty row, method 500 moves to step 508, and guest monitor 146 selects the empty row. Otherwise, if guest monitor 146 did not find an empty row, method 500 moves to step 510. At step 510, guest monitor 146 selects a filled row and copies information therein to another memory page. For example, the information may include instructions for handling a keyboard interrupt.

At step 512, guest monitor 146 stores an instruction address in the row selected at either step 508 or 510. Specifically, guest monitor 146 stores the address of a memory page at which guest monitor 146 stored remediation code at step 502, i.e., the address corresponding to the interrupt for remediating VM 120. At step 514, guest monitor 146 determines the next instruction guest OS 124 was going to execute before being frozen. To determine the next instruction, guest monitor 146 checks the program counter register of the one of vCPUs 144 corresponding to the one of interrupt dispatch tables 127. The program counter register stores the address of the next instruction to execute.

At step 516, guest monitor 146 replaces the next instruction for guest OS 124 to execute with an interrupt instruction. It should be noted that guest monitor 146 first copies the original next instruction for guest OS 124 to execute, to another memory page. The interrupt instruction includes the row number of the one of interrupt dispatch tables 127. At step 518, guest monitor 146 transmits a notification to hypervisor kernel 160 to transfer control of vCPUs 144 to guest OS 124. Hypervisor kernel 160 then restores the state of guest OS 124 to vCPUs 144 and returns control of vCPUs 144 to guest OS 124.

At step 520, guest monitor 146 waits until control of vCPUs 144 is transferred back to guest monitor 146. Control of vCPUs 144 is transferred back after guest OS 124 raises an interrupt and executes the remediation code written at step 502, as discussed further below in conjunction with FIG. 6. The last instruction of the remediation code is to signal hypervisor kernel 160 via a notification to transfer control of vCPUs 144 back to guest monitor 146. At step 522, after hypervisor kernel 160 has saved the state of guest OS 124 from registers of vCPUs 144, to system memory 174, and hypervisor kernel 160 has transferred control of vCPUs 144 to guest monitor 146, guest monitor 146 begins cleanup of the memory pages accessible to guest OS 124. Such cleanup is discussed further below in conjunction with FIG. 7. After step 522, method 500 ends.

Figure 6:
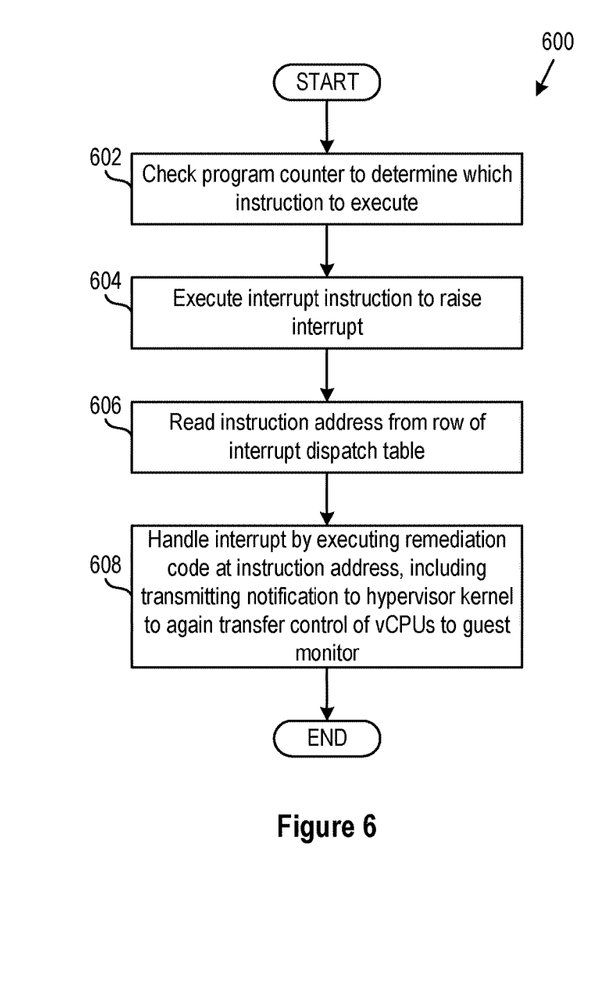
FIG. 6 is a flow diagram of steps carried out by the guest OS to handle the interrupt by executing the remediation code, according to an embodiment.

FIG. 6 is a flow diagram of steps of a method 600 carried out by guest OS 124 to handle an interrupt by executing remediation code, according to an embodiment. Method 600 is performed after guest monitor 146 returns control of vCPUs 144 to guest OS 124. At step 602, guest OS 124 checks the program counter register of the one of vCPUs 144 on which an interrupt instruction is stored. At step 604, guest OS 124 executes the instruction at the address stored by the program counter, which is the interrupt instruction. Execution of the interrupt instruction causes guest OS 124 to raise an interrupt.

At step 606, guest OS 124 accesses the one of interrupt dispatch tables 127 corresponding to the one of vCPUs 144. At a row specified by the interrupt instruction, guest OS 124 reads an instruction address of remediation code to execute. At step 608, guest OS 124 handles the interrupt by executing the remediation code at the instruction address to neutralize the security threat, e.g., by deleting code of a malicious process. As the last instruction of the remediation code, guest OS 124 transmits a notification to hypervisor kernel 160 to transfer control of vCPUs 144 to guest monitor 146 to begin cleanup, as discussed further below in conjunction with FIG. 7. Hypervisor kernel 160 then saves the state of guest OS 124 from registers of vCPUs 144, to system memory 174, and hypervisor kernel 160 transfers control of vCPUs 144 from guest OS 124 to guest monitor 146. After step 608, method 600 ends.

FIG. 7 is a flow diagram of steps of a method 700 carried out by guest monitor 146 to clean up the memory pages accessible to guest OS 124 after guest OS 124 executes remediation code, according to an embodiment. At step 702, guest monitor 146 deletes the remediation code from the memory pages. At step 704, guest monitor 146 locates the row of the one of interrupt dispatch tables 127 at which an instruction address of the deleted remediation code is stored, i.e., the address corresponding to an interrupt that guest OS 124 handled to remediate VM 120. Guest monitor 146 deletes the instruction address from the located row along with any other instructions stored in the located row.

At step 706, if applicable, guest monitor 146 copies information previously removed from the located row, back to the row. For example, the removed information may include instructions for handling a keyboard interrupt. At step 708, guest monitor 146 locates the interrupt instruction for raising the interrupt, in the memory pages accessible to guest OS 124. Guest monitor 146 replaces the interrupt instruction with a previously replaced next instruction to be executed by guest OS 124. At step 710, guest monitor 146 transmits a notification to hypervisor kernel 160 to again return control of vCPUs 144 to guest OS 124. Hypervisor kernel 160 then restores the state of guest OS 124 to vCPUs 144 and returns control of vCPUs 144 to guest OS 124. After step 710, method 700 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are hard disk drives (HDDs), SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest operating system (OS) that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of protecting an endpoint against a security threat detected at the endpoint, wherein memory pages in a memory space of the endpoint include memory pages for an operating system (OS), a software entity separate from the OS, and remediation code, the method comprising:
transferring control of virtual CPUs (vCPUs) of the endpoint from the OS to the separate software entity; and
while the separate software entity controls the vCPUs:
storing, in an interrupt dispatch table, an instruction address corresponding to an interrupt, wherein the remediation code is stored at the instruction address; and
replacing a next instruction to be executed by the OS, with an interrupt instruction, wherein the interrupt is raised when the OS executes the interrupt instruction, and the remediation code is executed as a result of handling of the interrupt that is raised.

2. The method of claim 1, further comprising:
loading the separate software entity into a portion of the memory pages of the endpoint that is inaccessible to the OS and to a malicious process.

3. The method of claim 1, wherein the endpoint is a virtual computing instance executing on a server in a data center.

4. The method of claim 1, wherein the transferring of the control of the vCPUs from the OS to the separate software entity is triggered by a timer expiring after a time interval elapsing.

5. The method of claim 1, wherein the transferring of the control of the vCPUs from the OS to the separate software entity is triggered by the OS writing to a particular location of the memory pages of the endpoint.

6. The method of claim 1, further comprising:
after the OS executes the interrupt instruction and after the control of the vCPUs is again transferred from the OS to the separate software entity:
deleting the remediation code from the memory pages;
deleting the instruction address from the interrupt dispatch table; and
replacing the interrupt instruction with the previously replaced next instruction to be executed by the OS.

7. The method of claim 1, further comprising:
transferring the control of the vCPUs from the OS to the separate software entity and then transferring the control of the vCPUs from the separate software entity to the OS, in an amount of time that causes the vCPUs to appear to the OS to be functioning normally such that it is unnecessary for the OS to execute recovery mechanisms.

8. A non-transitory computer-readable medium comprising instructions that are executable in a server, wherein the instructions when executed cause the server to carry out a method of protecting an endpoint against a security threat detected at the endpoint, and wherein memory pages in a memory space of the endpoint include memory pages for an operating system (OS), a software entity separate from the OS, and remediation code, the method comprising:
transferring control of virtual CPUs (vCPUs) of the endpoint from the OS to the separate software entity; and
while the separate software entity controls the vCPUs:
storing, in an interrupt dispatch table, an instruction address corresponding to an interrupt, wherein the remediation code is stored at the instruction address; and
replacing a next instruction to be executed by the OS, with an interrupt instruction, wherein the interrupt is raised when the OS executes the interrupt instruction, and the remediation code is executed as a result of handling of the interrupt that is raised.

9. The non-transitory computer-readable medium of claim 8, the method further comprising:
loading the separate software entity into a portion of the memory pages of the endpoint that is inaccessible to the OS and to a malicious process.

10. The non-transitory computer-readable medium of claim 8, wherein the endpoint is a virtual computing instance executing on the server in a data center.

11. The non-transitory computer-readable medium of claim 8, wherein the transferring of the control of the vCPUs from the OS to the separate software entity is triggered by a timer expiring after a time interval elapsing.

12. The non-transitory computer-readable medium of claim 8, wherein the transferring of the control of the vCPUs from the OS to the separate software entity is triggered by the OS writing to a particular location of the memory pages of the endpoint.

13. The non-transitory computer-readable medium of claim 8, the method further comprising:
after the OS executes the interrupt instruction and after the control of the vCPUs is again transferred from the OS to the separate software entity:
deleting the remediation code from the memory pages;
deleting the instruction address from the interrupt dispatch table; and
replacing the interrupt instruction with the previously replaced next instruction to be executed by the OS.

14. The non-transitory computer-readable medium of claim 8, the method further comprising:
transferring the control of the vCPUs from the OS to the separate software entity and then transferring the control of the vCPUs from the separate software entity to the OS, in an amount of time that causes the vCPUs to appear to the OS to be functioning normally such that it is unnecessary for the OS to execute recovery mechanisms.

15. A server including a processor and memory, wherein the processor executes instructions stored in the memory to perform a method of protecting an endpoint of the server against a security threat detected at the endpoint, and wherein memory pages in a memory space of the endpoint include memory pages for an operating system (OS), a software entity separate from the OS, and remediation code, the method comprising:
transferring control of virtual CPUs (vCPUs) of the endpoint from the OS to the separate software entity; and
while the separate software entity controls the vCPUs:
storing, in an interrupt dispatch table, an instruction address corresponding to an interrupt, wherein the remediation code is stored at the instruction address; and replacing a next instruction to be executed by the OS, with an interrupt instruction, wherein the interrupt is raised when the OS executes the interrupt instruction, and the remediation code is executed as a result of handling of the interrupt that is raised.

16. The server of claim 15, the method further comprising:
loading the separate software entity into a portion of the memory pages of the endpoint that is inaccessible to the OS and to a malicious process.

17. The server of claim 15, wherein the endpoint is a virtual computing instance executing on the server in a data center.

18. The server of claim 15, wherein the transferring of the control of the vCPUs from the OS to the separate software entity is triggered by a timer expiring after a time interval elapsing.

19. The server of claim 15, wherein the transferring of the control of the vCPUs from the OS to the separate software entity is triggered by the OS writing to a particular location of the memory pages of the endpoint.

20. The server of claim 15, the method further comprising:
after the OS executes the interrupt instruction and after the control of the vCPUs is again transferred from the OS to the separate software entity:
deleting the remediation code from the memory pages;
deleting the instruction address from the interrupt dispatch table; and
replacing the interrupt instruction with the previously replaced next instruction to be executed by the OS.

* * * * *